(12) United States Patent
Locker et al.

(10) Patent No.: US 9,176,965 B2
(45) Date of Patent: Nov. 3, 2015

(54) ASSOCIATING SEARCH TERMS WITH A DOWNLOADED FILE

(75) Inventors: Howard J. Locker, Cary, NC (US); Yang Jinping, Beijing (CN); Shao Xiang, Beijing (CN)

(73) Assignee: Lenovo (Singapore) PTE. LTD., Tech Park (SG)

( * ) Notice: Subject to any disclaimer, the term of this patent is extended or adjusted under 35 U.S.C. 154(b) by 445 days.

(21) Appl. No.: 13/287,823

(22) Filed: Nov. 2, 2011

(65) Prior Publication Data

US 2013/0110809 A1    May 2, 2013

(51) Int. Cl.
*G06F 7/00* (2006.01)
*G06F 17/30* (2006.01)

(52) U.S. Cl.
CPC ................................. *G06F 17/30067* (2013.01)

(58) Field of Classification Search
CPC ............ G06F 17/30017; G06F 17/243; G06F 17/30696; G06F 17/30675; G06F 17/30864; G06F 17/30067; G06F 17/3007; G06F 17/301
See application file for complete search history.

(56) References Cited

U.S. PATENT DOCUMENTS

| | | | | |
|---|---|---|---|---|
| 5,163,148 A | * | 11/1992 | Walls | 711/162 |
| 5,544,360 A | * | 8/1996 | Lewak et al. | 1/1 |
| 5,796,945 A | * | 8/1998 | Tarabella | 709/219 |
| 6,880,008 B1 | * | 4/2005 | Yoneda | 709/226 |
| 2003/0220939 A1 | * | 11/2003 | Nagao | 707/104.1 |
| 2004/0267724 A1 | * | 12/2004 | Hoffman | 707/3 |
| 2008/0168048 A1 | * | 7/2008 | Bell et al. | 707/5 |
| 2008/0250029 A1 | * | 10/2008 | Fernandez | 707/10 |
| 2009/0327235 A1 | * | 12/2009 | Coladonato et al. | 707/3 |

* cited by examiner

*Primary Examiner* — Azam Cheema
(74) *Attorney, Agent, or Firm* — Kunzler Law Group

(57) ABSTRACT

An apparatus for associated search terms with a downloaded file includes a storage device storing machine-readable code and a processor executing the machine-readable code. The machine-readable code includes a reference module that references one or more search terms for a file selected for download. The file is retrieved by a search engine searching with the one or more search terms. The machine-readable code includes an embedding module that embeds the one or more search terms into data associated with a file copy. The file copy includes a copy of the file for saving on a storage device.

18 Claims, 6 Drawing Sheets

ASSOCIATING SEARCH TERMS WITH A DOWNLOADED FILE

BACKGROUND

1. Field

The subject matter disclosed herein relates to search terms and downloaded files located by those search terms and more particularly relates to associating search terms with a downloaded file.

2. Description Of The Related Art

When a user downloads a file from a network, such as local network, the Internet, a cloud-computing platform, and the like, the downloaded file often lacks a context for the user to relocate the downloaded file in the future. For example, a user may have downloaded a file as part of a network search. At a later time, the user may wish to locate the downloaded copy of the file on the user's local computer, but may have difficulty because the downloaded file lacks any indication of the topic of the user's search, often sharing the filename of the original file. The filename and file data may include different terms than those associated with the user's search topic.

Furthermore, the downloaded file may not be on an indexed drive or may not be indexed, preventing the user from key word searching on the local computer. Often, the user may re-perform the search and re-download the file.

BRIEF SUMMARY

Based on the foregoing discussion, the inventors have recognized a need for an apparatus, system, and method that associates search terms used to locate a file with a downloaded copy of the file. Beneficially, such an apparatus, system, and method would embed the search terms into data associated with the downloaded copy.

The embodiments of the present subject matter have been developed in response to the present state of the art, and in particular, in response to the problems and needs in the art that have not yet been fully solved by currently available searching mechanisms. Accordingly, the embodiments have been developed to provide a method, apparatus, and system for associating search terms with a downloaded file that overcome many or all of the above-discussed shortcomings in the art.

An apparatus is provided with a storage device storing machine-readable code, a processor executing the machine-readable code, and a plurality of modules configured to functionally execute the steps for associating search terms with a downloaded file. These modules in at least a portion of the described embodiments include a reference module and an embedding module.

In one embodiment, the reference module references one or more search terms for a file selected for download. In one embodiment, the file is retrieved by a search engine searching with the one or more search terms. In one embodiment, the embedding module embeds the one or more search terms into data associated with a file copy. In one embodiment, the file copy includes a copy of the file for saving on a storage device.

A method is also presented and in the disclosed embodiments, the method substantially includes the steps to carry out the functions presented above with respect to the operation of the described apparatus. In one embodiment, the method includes referencing one or more search terms for a file selected for download. In one embodiment, the file is retrieved by a search engine searching with the one or more search terms. In one embodiment, the method includes embedding the one or more search terms into data associated with a file copy and the file copy includes a copy of the file for saving on a storage device.

A computer program product is also presented. In one embodiment, the computer program product includes referencing one or more search terms for a file selected for download. In one embodiment, the file is retrieved by a search engine searching with the one or more search terms. In one embodiment, the computer program product includes embedding the one or more search terms into data associated with a file copy and the file copy includes a copy of the file for saving on a storage device.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
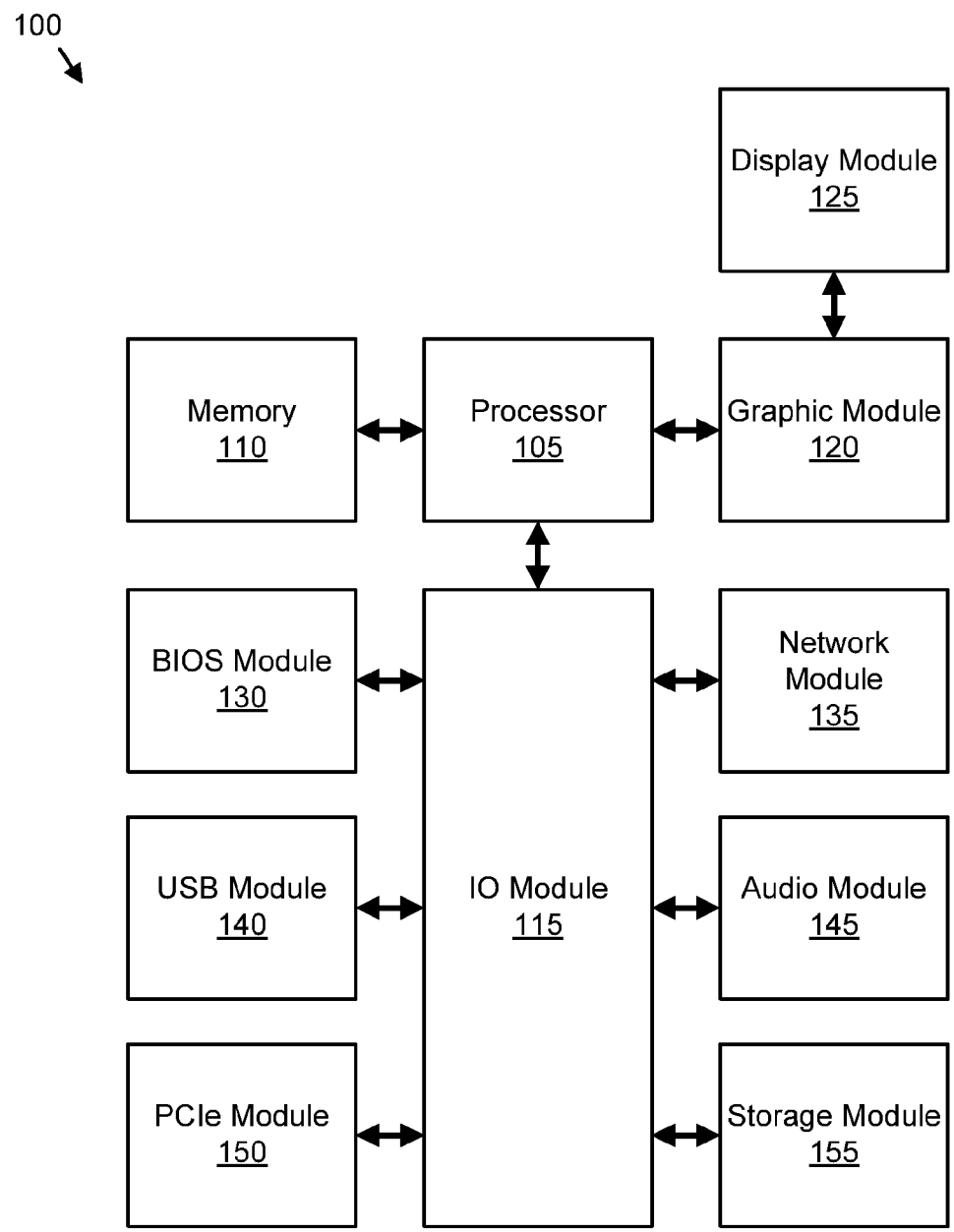
FIG. 1 is a schematic block diagram illustrating one embodiment of a computer system in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of a computer system 100. The computer system 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computer system 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computer system 100, so that computer readable software instructions stored on the storage module 155 can load, execute, and assume control of the computer system 100. Alternatively, the BIOS module 130 may comprise a coded program embedded on a chipset that recognizes and controls various devices that make up the computer system 100.

The network module 135 may communicate with the IO module 115 to allow the computer system 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
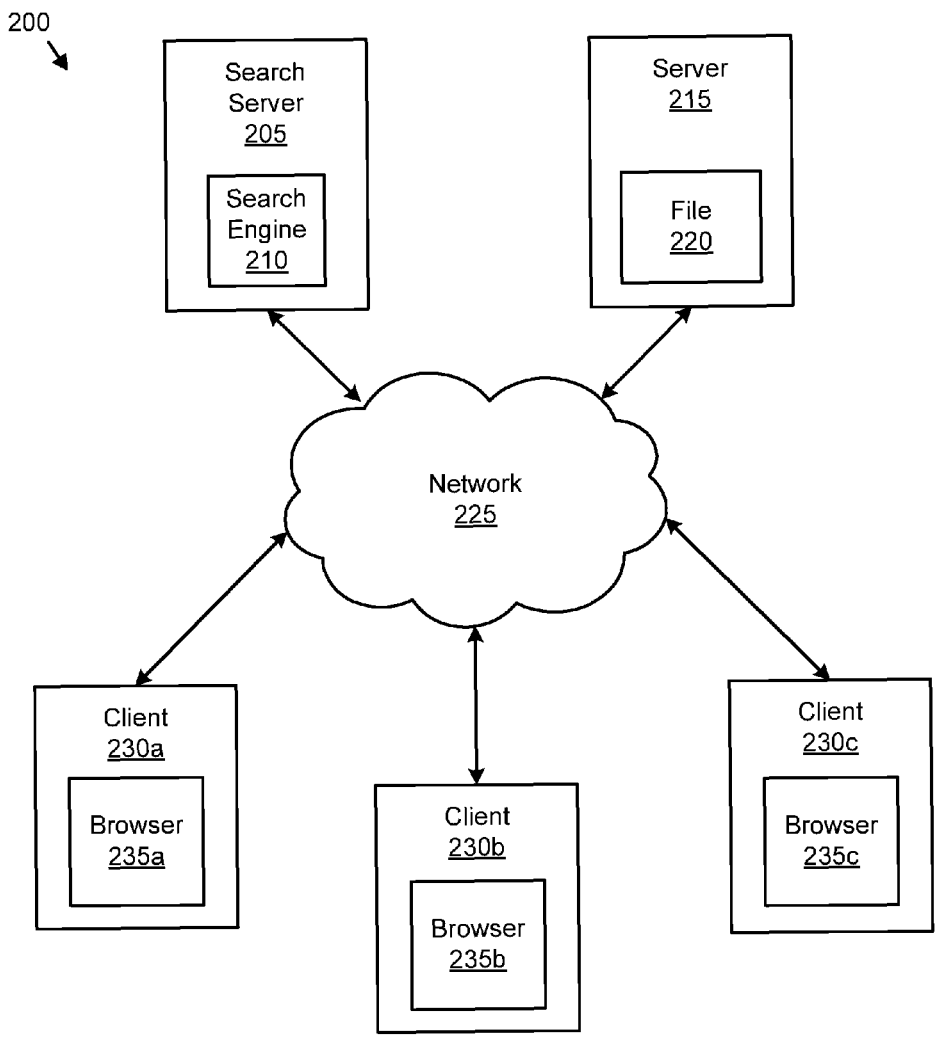
FIG. 2 is a schematic block diagram illustrating one embodiment of a system for associating search terms with a downloaded file in accordance with the present subject matter.

FIG. 2 illustrates one embodiment of a system 200 for associating search terms with a downloaded file. The system includes a search server 205 with a search engine 210, a server 215 with a file 220, a network 225, and a plurality of clients 230a-c, each client 230a-c including a browser 235a-c.

The search server 205 communicates with the network 225 and may host and provide the search engine 210 to search for and retrieve information, documents, and/or files from one or more computer systems, such as the server 215. The search engine 210 may receive a search query with one or more search terms, and search for information, documents, and/or files matching the search query (e.g. a file may include one or more of the search terms and/or variations of the search terms) as is known in the art. The search engine 210 may then present one or more search results including links to the search results on their respective storage locations and/or the files of the search results themselves. In one embodiment, the search engine 210 is a web search engine 210 searching web pages, documents, and/or files on the Internet. In other embodiments, the search engine 210 searches documents and files on an intranet or other internal computer network. In one embodiment, the search server 205 is part of a cloud computing platform to host, store, and/or provide applications, files, and data for on-demand access over the network 225.

The search server 205 may be embodied as an information handling device and/or a computing device and may comprise one embodiment of the computer system 100 of FIG. 1 with at least a portion of its components, including memory 110, a storage module 155 storing computer readable programs, and/or a processor 105 that executes the computer readable programs as is known to those skilled in the art.

The search server 205 communicates over the network 225 with the server 215 and searches contents of the server 215, such as the file 220, and retrieves contents of the server 215 that meets criteria of a search query. The server 215 also communicates with the network 225 and may host, store and/or provide one or more files including the file 220. In one embodiment, the server 215 is a web server, hosting and providing web pages, documents, and/or files for the Internet. In one embodiment, the server 215 stores documents and/or files on an intranet or other internal network. In one embodiment, the server 215 is part of a cloud computing platform as described above. Of course, the server 215 may store and provide data for one or more clients 230a-c in any suitable configuration.

The server 215 may be embodied as an information handling device and/or a computing device and may comprise one embodiment of the computer system 100 of FIG. 1 with at least a portion of its components including memory 110, a storage module 155 storing computer readable programs, and/or a processor 105 that executes the computer readable programs as is known to those skilled in the art. The file 220 is an electronic file for storing information. The file 220 may comprise any number of file 220 types including a text document, one or more images, a video, a database file 220, a web page, or the like. Although a single file 220 is depicted, of course, the server 215 may store a plurality of files 220.

The network 225 may be embodied as a global communications network such as the Internet, a Local Area Network ("LAN"), multiple LANs communicating over the internet, a Wireless Local Area Network ("WLAN"), a mobile telecommunications network, or any other suitable communications network. Each of the one or more clients 230a-c communicates with the search server 205 and, in certain embodiments, the server 215, through the network 225. Each client 230a-c may be embodied as a desktop computer, a portable computer, a server, a mainframe computer, a handheld computing device, a touch device, a personal desktop assistant ("PDA"), a tablet computer, an eBook reader, a mobile phone, a Smartphone, and the like. Each client 230a-c may include a browser 235a-c or other suitable application to interface with the search engine 210 and download files 220 retrieved by the search engine 210. In one embodiment, the browser 235a-c is embodied as a web browser configured to view, retrieve, and/or present information, files and documents from the Internet. In one embodiment, the browser 235a-c is a file browser or file manager application configured to view, retrieve, and/or access files in a file system.

A user may access the search engine 210 using the browser 235a-c. For example, the user may view a search engine 210 interface through the browser 235a-c, and the search engine interface may present an input mechanism (e.g. a text input field) for the user to enter a search query, with one or more search terms, into the search engine 210 as described above. The search engine 210 may then use the search query to search the server 215 for documents, files, and the like, that meet the search query. The search engine 210 may send the search results to the browser 235a-c, which presents the search results to the user. By selecting a particular search result, the user may view, access, and/or download the particular search result directly from the server 215 hosting the search result or, in some embodiments, the search server 205.

Figure 3:
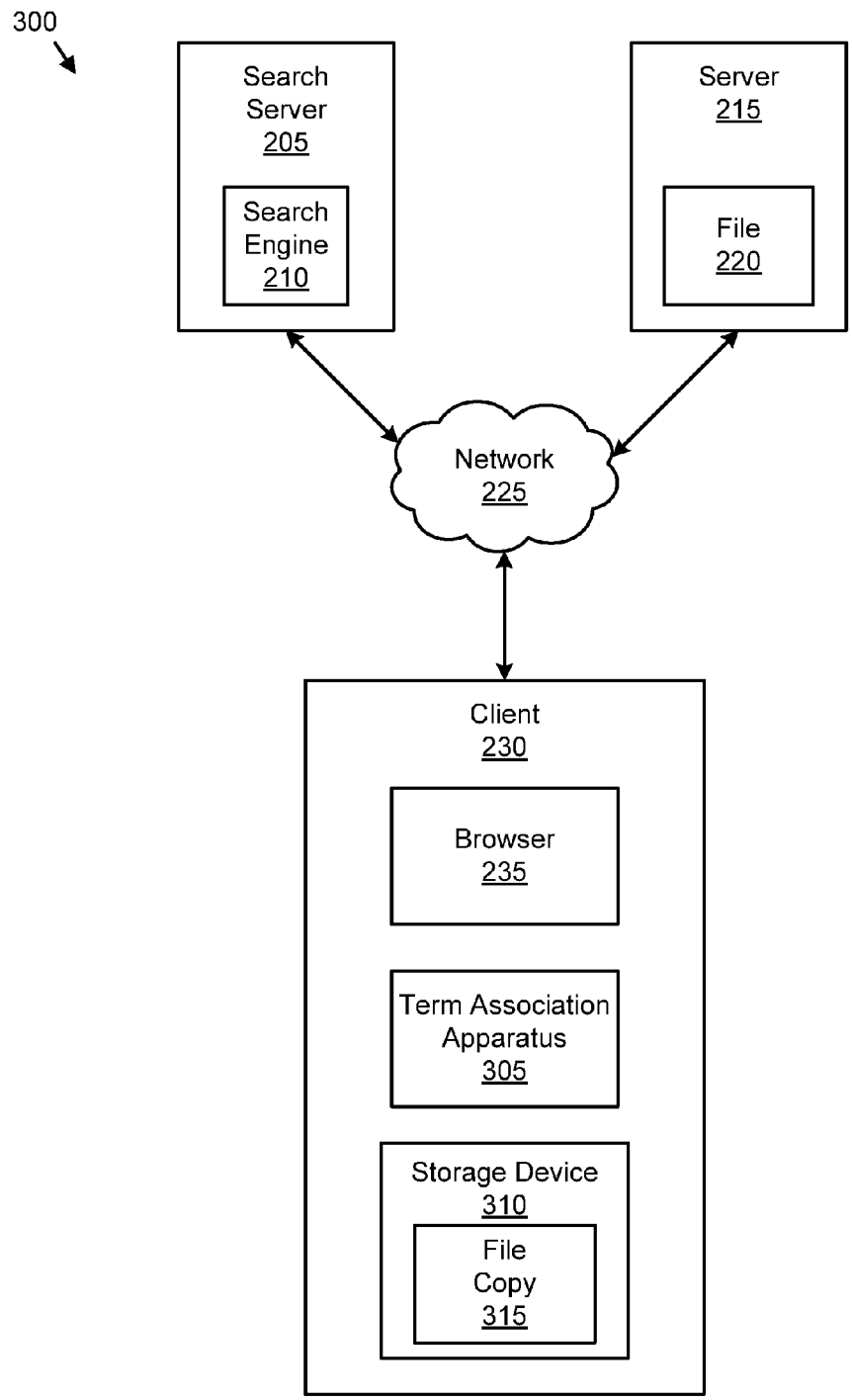
FIG. 3 is a schematic block diagram illustrating one embodiment of a system for associating search terms with a downloaded file in accordance with the present subject matter.

FIG. 3 illustrates one embodiment of a system 300 for associating search terms with a downloaded file. The system 300 includes the search server 205 with the search engine 210, the server 215 with the file 220, the network 225, and a client 230 with a browser 235. These elements may be substantially similar to the like numbered elements in FIG. 2. The client 230 may also include a term association apparatus 305 and a storage device 310 with a file copy 315 described below.

As described above, a user, through an application such as the browser 235, may perform a search on the search engine 210 to retrieve information on one or more computing systems. In one embodiment, the user downloads a copy of the file 220, the file copy 315, to a storage device 310 as a result of a search using particular search terms of a search query. The storage device 310, in one embodiment, is a storage device 310 in communication with the client 230. The storage device 310 may be local to the client 230 (e.g. a local drive of the client 230) or in communication with the client 230 over a network 225. In one embodiment, the storage device 310 is separate and distinct from the server 215 hosting the file 220 (e.g. the file 220 selected for download). For example, the user may search using the term "Restaurants" and "Raleigh" and downloaded a copy of the file "Herons Menu.pdf," a menu for a particular restaurant, to the storage device 310.

However, the user may often associate the file copy 315 with the topic of the user's search that yielded the file copy's 315 original file 220. As a result, the user may have difficulty locating the file copy 315 at a later time, and as files often retain their filename when downloaded, the user's topic may not be evident from the file copy 315 itself. For example, the file "Herons Menu.pdf" has no indication that it was downloaded as part of a search with the terms "Restaurants" and "Raleigh."

Therefore, the client 230 includes a term association apparatus 305. The term association apparatus 305 may associate and/or embed search terms into data associated with a file copy 315 of a file 220 resulting from a search using the search terms. In one embodiment, the term association apparatus 305 may insert the search terms into the filename (e.g. the base name of the file copy 315) of the file copy 315, into metadata for the file copy 315, and/or the like. As a result, when the user searches for the file copy 315 that the user downloaded, the user may be able to locate the file copy 315 using similar search terms of the topic of the search. The user may also, upon viewing the file copy 315 on the client 230, be reminded of the topic of the search and context of the file copy 315. Therefore, the user may more easily find the file copy 315 at a later time. Continuing the example above, the term association apparatus 305 may change the filename of "Herons Menu.pdf" to "Restaurants Raleigh Herons Menu.pdf." The user may then use the same search terms to locate the file copy 315 on the client 230 without having to search for the file 220 again on the server 215.

The term association apparatus 305 may reside in or be in communication with the client 230. In one embodiment, the term association apparatus 305 communicates with and/or is integrated with the browser 235, the search engine 210, or the like. In one embodiment, the term association apparatus 305 comprises a browser plug-in. All or a portion of the user interface adapter apparatus may be stored on memory and executed by a processor (e.g. of the client 230).

Figure 4:
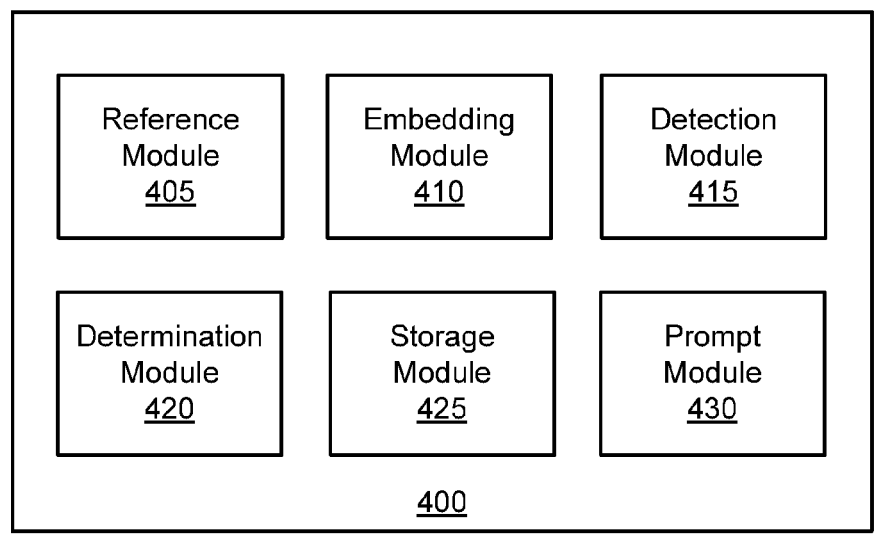
FIG. 4 is a schematic block diagram illustrating one embodiment of an apparatus for associating search terms with a downloaded file in accordance with the present subject matter.

FIG. 4 illustrates one embodiment of an apparatus 400 for associating search terms with a downloaded file. The apparatus 400 may comprise one embodiment of the term interface apparatus 305 depicted in FIG. 3. The apparatus 600 includes one or more of a reference module 405, an embedding module 410, a detection module 415, a determination module 420, a storage module 425, and a prompt module 430.

The reference module 405, in one embodiment, references, copies, and/or obtains one or more search terms for a file 220 selected for download. The file 220, in one embodiment, is retrieved, referenced by, and/or presented by a search engine 210 searching with the one or more search terms. In one embodiment, the reference module 405 references the one or more search terms from a browser 235 in communication with the search engine 210. For example, in one embodiment, the browser 235 displays search terms in its address bar for web pages displaying search results and the reference module 405 references the search terms from the address bar in response to a user selecting one of the search results for download. In one embodiment, the reference module 405 references the search terms from a web browser's history.

The embedding module 410, in one embodiment, embeds and/or associates the one or more search terms into data associated with a file copy 315. As described above, the file copy 315 is a copy of the file 220, located in a search, for saving on a storage device 310 (e.g. a storage device 310 local to the client 230 or in communication with the client 230). In one embodiment, the file copy 315 is a duplicate of the file 220 (or would be a duplicate of the file 220) before the embedding module 410 embeds the search terms.

In one embodiment, the embedding module 410 inserts the search terms into a filename of the file copy 315. The filename may be the base name of the file copy 315 and the name representing the file copy 315 in the file system. In a further embodiment, the embedding module 410 appends the search terms to one or more pre-existing terms in the filename of the file copy 315. The embedding module 410 may append the search terms prior to the pre-existing terms in the filename or may append the search terms after the pre-existing terms in the filename. In a one embodiment, the embedding module 410 replaces one or more pre-existing terms in the filename with the one or more search terms.

In one embodiment, embedding the search terms includes the embedding module 410 inserting the one or more search terms into metadata of the file copy 315. The metadata may be part of the file copy 315 and/or associated with the file copy 315 on the storage device 310. As is known in the art, metadata for a file may describe attributes of the file. Examples of metadata include size, tags, comments, category, author, subject, and the like. In one embodiment, the embedding module 410 may insert the search terms into the subject tag, the category tag or the like. In one embodiment, the embedding module 410 inserts the search terms into a metadata that the client 230 is configured to include in searches of files on the client 230 such that the search mechanism on the client 230 may retrieve the file copy 315 by referencing the search terms in the metadata.

In certain embodiments, the file 220 (and the file copy 315) may not have any associated metadata. Therefore, in one embodiment, the embedding module 410 creates metadata for the file copy 315 and inserts the search terms into the created metadata. The embedding module 410 may create metadata according to industry standard metadata formats. For example, the embedding module 410 may detect that the file copy 315 lacks metadata, determine the file type of the file copy 315, and create metadata specific to the file type of the file copy 315.

In one embodiment, the embedding module 410 is user configurable to insert search terms into data associated with the file copy 315 based on user and/or default settings. For example, the user may configure the embedding module 410 to insert search terms into the filename of the file copy 315 along with pre-existing terms in the filename. In one embodiment, the embedding module 410 may embed search terms into the file copy 315 upon completion of the download before notifying the user that the file copy 315 has been downloaded. In one embodiment, the embedding module 410 may embed the search terms into the file copy 315 before the file copy 315 is downloaded. For example, the embedding module 410 may insert the search terms into a suggested filename in a "save as" file save prompt of a browser 235 that lets the user select a download location and/or filename for the file copy 315.

The detection module 415, in one embodiment, detects a download request for the file 220. The download request may be a request to save a copy of the file 220 on the storage device 310. In one embodiment, the browser 235 prompts the user to download a file 220 in response to the user selecting or clicking on a filename or indicator. In one embodiment, the reference module 405 references the search terms for the file 220 selected for download in response to the detection module 415 detecting the download request.

The determination module 420, in one embodiment, determines whether a particular file 220 selected for download is related to one or more search terms. In one embodiment, the determination module 420 determines that the most recent search terms relate to the particular file 220. For example, a user may select a file 220 for download and the determination module 420 may search through the browser's 235 history until the determination module 420 locates a browser history entry for a search. The reference module 405 may reference the corresponding search terms in response to a notification from the determination module 420 of the particular search terms. In a further embodiment, the determination module 420 references the most recent search terms if the associated search was performed within a predetermined time period before the file 220 is selected for download. In one embodiment, the embedding module 410 embeds the one or more search terms in response to the determination module 420 determining that the particular file 220 is related to the one or more search terms.

The storage module 425, in one embodiment, stores the one or more search terms. In certain embodiments, the storage module 425 stores search terms related to searches of a user and the reference module 405 references the search terms from the storage module 425. Therefore, in these embodiments, if the browser 235 does not include a history with search terms, or if the history is cleared, the storage module 425 may still retain the search terms. The storage module 425 may also storage multiple sets of search terms such that the user may select a particular set of search terms to be embedded into the file copy 315.

The prompt module 430, in one embodiment, displays a user prompt for a user confirmation to embed the search terms into data associated with the file copy 315. In one embodiment, the embedding module 410 embeds the search terms into data associated with the file copy 315 in response to the user confirmation through the user prompt. For example, the prompt module 430 may query a user to determine whether the user would like the embedding module 410 to embed the search terms. In one embodiment, the prompt module 430 displays multiple sets of search terms, among which the user may select to embed in the file copy 315. For example, the prompt module 430 may display sets of search terms for with a predetermined number of searches.

Figure 5:
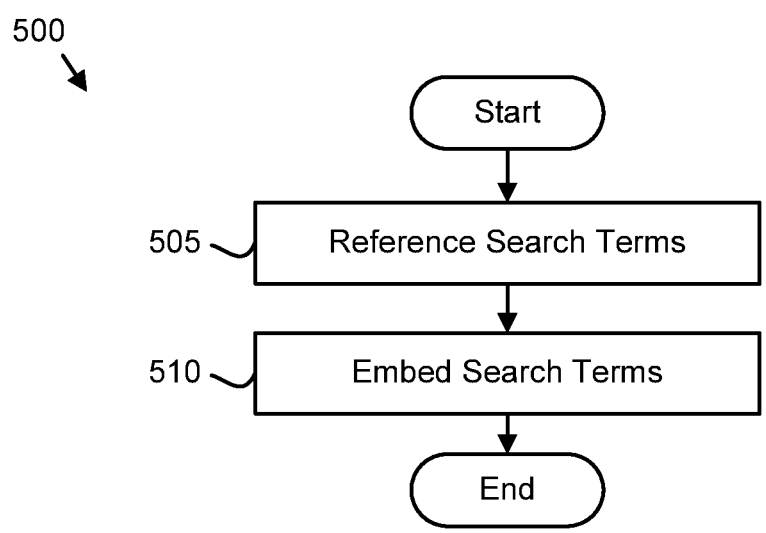
FIG. 5 is a schematic flow chart diagram illustrating one embodiment of a method for associating search terms with a downloaded file in accordance with the present subject matter.

FIG. 5 illustrates one embodiment of a method 500 for associating search terms with a downloaded file. The method 500 may implement at least a portion of the functions of the apparatus 400 of FIG. 4. The description of the method 500 refers to elements of FIGS. 1-4, like numbers referring to like elements. The method 500 begins and the reference module 405 references 505 one or more search terms for a file 220 selected for download. The file 220 was retrieved by a search engine 210 searching with the one or more search terms. Next, embedding module 410 embeds 510 the one or more search terms into data associated with a file copy 315, which is a copy of the file for saving on a storage device 310. The embedding module 410 may embed the search terms into the filename of the file copy 315, into metadata associated with the file copy, and/or the like. Then, the method 500 ends.

Figure 6:
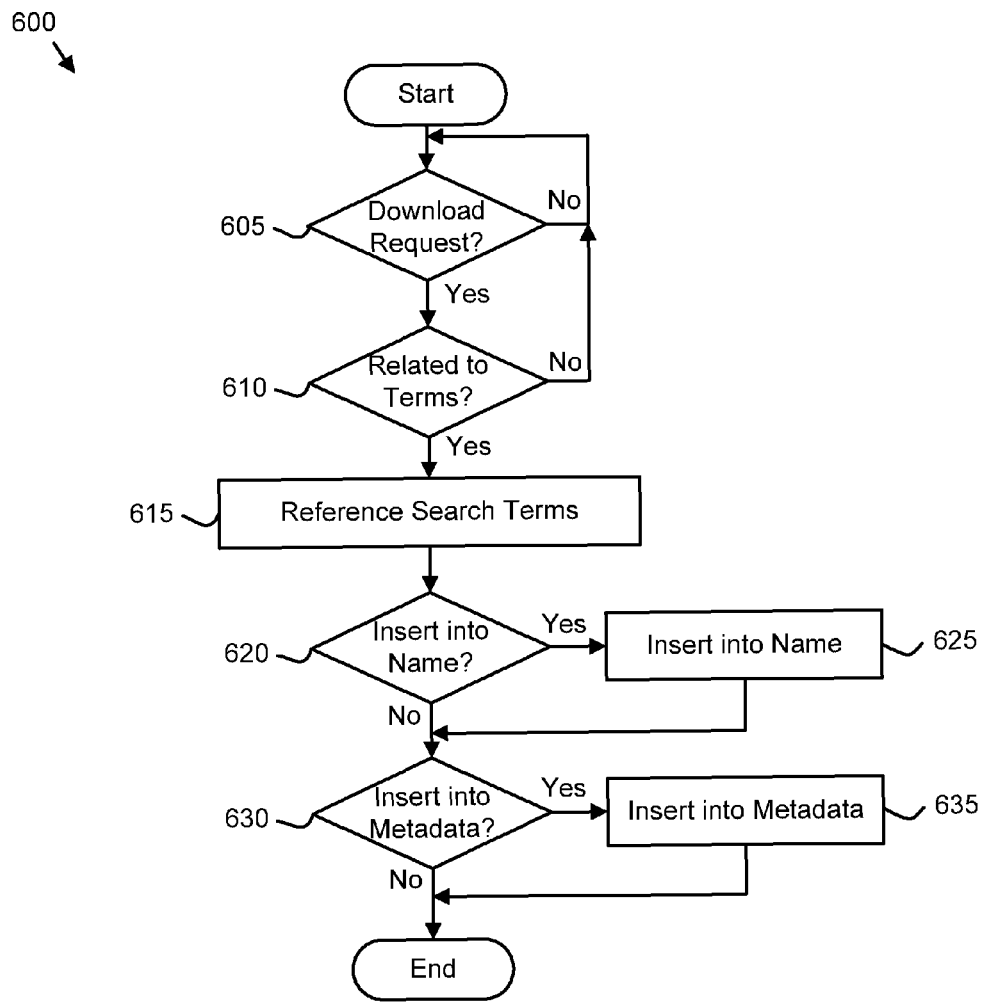
FIG. 6 is a schematic flow chart diagram illustrating another embodiment of a method for associating search terms with a downloaded file in accordance with the present subject matter.

FIG. 6 illustrates another embodiment of a method 600 for associating search terms with a downloaded file. The method 600 may implement at least a portion of functions of the apparatus 400 of FIG. 4. The description of the method 600 refers to elements of FIGS. 1-4, like numbers referring to like elements.

The method 600 begins and the detection module 415 monitors 605 for a download request for a file 220. When the detection module 415 detects 605 a download request for a particular file 220, the determination module 420 determines 610 whether the particular file 220 selected for download is related to one or more search terms. If the determination module 420 determines 610 that the particular file 220 is not related to any search terms, the detection module 415 continues monitoring 605 for a download request.

Alternatively, if the determination module 420 determines 610 that the particular file 220 is related to search terms, the reference module 405 references 615 the search terms. Next, if the embedding module 410 determines 620 to embed the one or more search terms into the filename of a file copy of the particular file 220, the embedding module 410 inserts 625 the one or more search terms into the filename. In one embodiment, the embedding module 410 refers to user-configurable settings in determining whether to embed the search terms into the filename. The embedding module 410 may append the terms into the filename along with other pre-existing terms. In one embodiment, the embedding module 410 replaces one or more pre-existing terms in the filename with the one or more search terms.

Next, if the embedding module 410 determines 630 to insert the one or more search terms into metadata associated with the file copy 315, the embedding module 410 inserts 635 the one or more terms into the metadata. Then, the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a storage device storing machine-readable code;
   a processor executing the machine-readable code, the machine-readable code comprising:
   a detection module detecting a download request for a file, the download request comprising a request to save a copy of the file on the storage device;
   a reference module referencing, in response to the detection module detecting the download request, one or more search terms provided to a search engine to locate the file, the file being included in search results by the search engine searching with the one or more search terms, wherein the reference module references the one or more search terms from a browser in communication with the search engine; and
   an embedding module embedding the one or more search terms into data associated with a file copy, the file copy comprising a copy of the file for saving on a storage device.

2. The apparatus of claim 1, wherein the embedding module embedding the one or more search terms further comprises the embedding module inserting the one or more search terms into a filename of the file copy.

3. The apparatus of claim 2, wherein the embedding module appends the one or more search terms to one or more pre-existing terms in the filename of the file copy.

4. The apparatus of claim 2, wherein the embedding module replaces one or more pre-existing terms in the filename with the one or more search terms.

5. The apparatus of claim 1, wherein the embedding module embedding the one or more search terms comprises the embedding module inserting the one or more search terms into metadata of the file copy.

6. The apparatus of claim 1, further comprising a determination module determining that a particular file selected for download is related to the one or more search terms, wherein the embedding module embeds the one or more search terms into data associated with a copy of the particular file for saving on the storage device in response to the determination module determining that the particular file is related to the one or more search terms.

7. The apparatus of claim 1, further comprising a storage module storing the one or more search terms, wherein the reference module references the one or more search terms from the storage module.

8. The apparatus of claim 1, further comprising a prompt module displaying a user prompt for a user confirmation to embed the one or more search terms into data associated with the file copy, wherein the embedding module embeds the one or more search terms into data associated with the file copy in response to the user confirmation through the user prompt.

9. A method comprising:
   detecting a download request for a particular file;
   referencing one or more search terms provided to a search engine, the particular file being included in search results by the search engine searching with the one or more search terms, wherein the reference module references the one or more search terms from a browser in communication with the search engine;

determining whether the particular file is related to the one or more search terms; and embedding, in response to determining that the particular file is related to the one or more search terms, the one or more search terms into data associated with a file copy, the file copy comprising a copy of the file for saving on a storage device.

10. The method of claim 9, wherein embedding the one or more search terms further comprises inserting the one or more search terms into a filename of the file copy.

11. The method of claim 10, wherein inserting the one or more search terms further comprises appending the one or more search terms to one or more pre-existing terms in the filename of the file copy.

12. The method of claim 10, wherein inserting the one or more search terms further comprises replacing one or more pre-existing terms in the filename with the one or more search terms.

13. The method of claim 9, wherein embedding the one or more search terms further comprises inserting the one or more search terms into metadata of the file copy.

14. The method of claim 9, further comprising storing the one or more search terms, wherein referencing one or more search terms comprises obtaining the one or more stored search terms.

15. A computer program product comprising a non-transitory storage device storing machine readable code executed by a processor to perform the operations of:

detecting a download request for a particular file;

referencing one or more search terms provided to a search engine, the particular file being included in search results by the search engine searching with the one or more search terms, wherein the reference module references the one or more search terms from a browser in communication with the search engine;

determining whether the particular file is related to the one or more search terms; and embedding, in response to determining that the particular file is related to the one or more search terms, the one or more search terms into data associated with a file copy, the file copy comprising a copy of the file for saving on a storage device.

16. The computer program product of claim 15, wherein embedding the one or more search terms further comprises inserting the one or more search terms into a filename of the file copy.

17. The computer program product of claim 15, wherein embedding the one or more search terms further comprises inserting the one or more search terms into metadata of the file copy.

18. The computer program product of claim 15, further comprising displaying a user prompt for a user confirmation to embed the one or more search terms into data associated with the file copy, wherein embedding the one or more search terms into data associated with the file copy occurs in response to the user confirmation through the user prompt.

* * * * *